United States Patent
Galazin

(10) Patent No.: US 10,086,667 B2
(45) Date of Patent: Oct. 2, 2018

(54) AXLE TIE ROD

(71) Applicant: SAF-HOLLAND GmbH, Bessenbach (DE)

(72) Inventor: Gregory Galazin, Muskegon, MI (US)

(73) Assignee: SAF-HOLLAND GmbH, Bessenbach (DE)

( * ) Notice: Subject to any disclaimer, the term of this patent is extended or adjusted under 35 U.S.C. 154(b) by 2 days.

(21) Appl. No.: 15/529,740

(22) PCT Filed: Nov. 16, 2015

(86) PCT No.: PCT/EP2015/076657
§ 371 (c)(1),
(2) Date: May 25, 2017

(87) PCT Pub. No.: WO2016/083174
PCT Pub. Date: Jun. 2, 2016

(65) Prior Publication Data
US 2017/0305224 A1   Oct. 26, 2017

(30) Foreign Application Priority Data

Nov. 25, 2014  (DE) .................. 10 2014 117 207

(51) Int. Cl.
*B60G 9/02*   (2006.01)

(52) U.S. Cl.
CPC .......... *B60G 9/02* (2013.01); *B60G 2200/322* (2013.01); *B60G 2202/152* (2013.01); *B60G 2204/143* (2013.01); *B60G 2206/8201* (2013.01)

(58) Field of Classification Search
CPC ............... B60G 9/02; B60G 2200/322; B60G 2202/152; B60G 2204/143; B60G 2206/8201
USPC ...................................... 280/124.11
See application file for complete search history.

(56) References Cited

U.S. PATENT DOCUMENTS

| 5,639,110 A * | 6/1997 | Pierce | B60G 7/001 280/124.11 |
| 7,048,288 B2 * | 5/2006 | Chan | B60G 7/001 280/124.11 |
| 7,178,816 B2 * | 2/2007 | Chan | B60G 7/001 280/124.116 |

(Continued)

FOREIGN PATENT DOCUMENTS

| DE | 69811741 | 10/2003 |
| DE | 112011100227 | 10/2012 |

(Continued)

OTHER PUBLICATIONS

European Search Report; International Search Report; dated Jan. 8, 2016.

*Primary Examiner* — Faye M Fleming
(74) *Attorney, Agent, or Firm* — Price Heneveld LLP

(57) ABSTRACT

An axle tie rod adapted to be secured to an axle tube of a utility vehicle includes a connecting element and at least one link element, wherein the connecting element has a first connecting section in which a welded connection with the link element can be produced, wherein the connecting element has a second connecting section in which a welded connection with an axle tube can be produced, and wherein the second connecting section is configured to engage around the axle tube.

16 Claims, 2 Drawing Sheets

(56) References Cited

U.S. PATENT DOCUMENTS

| | | | | |
|---|---|---|---|---|
| 7,740,255 B2* | 6/2010 | Holt | ............. | B60G 7/001 |
| | | | | 280/124.11 |
| 9,463,667 B2* | 10/2016 | Spielmann | ............. | B60G 7/001 |
| 2003/0067134 A1 | 4/2003 | Galazin | | |
| 2003/0146592 A1* | 8/2003 | Chalin | ............. | B60G 7/008 |
| | | | | 280/124.116 |
| 2004/0080132 A1* | 4/2004 | Chan | ............. | B60G 7/001 |
| | | | | 280/124.11 |
| 2009/0212523 A1 | 8/2009 | Koschinat | | |

FOREIGN PATENT DOCUMENTS

| | | |
|---|---|---|
| DE | 102011083221 | 3/2013 |
| NZ | 534506 | 10/2005 |
| WO | 0001548 | 1/2000 |

* cited by examiner

AXLE TIE ROD

BACKGROUND OF THE INVENTION

The present invention relates to an axle tie rod, in particular for use in utility vehicles, and to a method for producing an axle tie rod.

Axle tie rods are already known from the prior art. In the past, numerous attempts have been made to simplify the production of axle tie rods and at the same time optimize their weight and service life. As such, axle tie rods are frequently embodied, in particular, as cast parts which can be connected to the rigid axle of a utility vehicle via various connecting elements. However, the fabrication of the axle tie rods which are known from the prior art continues to be extremely costly and there are only a few areas in which weight on the axle tie rods can actually be saved. Furthermore, it has become apparent that axle tie rods which are embodied in multiple parts usually only have a small number of parts in common with relatively large or relatively small designs and therefore too little standardization is possible for certain components.

The object of the present invention is therefore considered to be to make available an axle tie rod which can be fabricated particularly easily, permits a reduction in weight, increases the service life and uses components which can be employed as universally as possible. Furthermore, the object of the present invention is to specify a method for producing an axle tie rod which is used for this object.

SUMMARY OF THE INVENTION

According to the invention, an axle tie rod is provided to be secured to an axle tube of a utility vehicle, which axle tie rod comprises a connecting element and at least one link element, wherein the connecting element has a first connecting section in which a welded connection with the link element can be or is produced, wherein the connecting element has a second connecting section in which a welded connection with an axle tube can be or is produced, wherein the second connecting section is configured to engage around the axle tube. The axle tie rod is preferably the trailing arm of the chassis of a utility vehicle which is pivotably suspended from the frame and serves to support an axle tube, which in turn serves to provide rotational support to a wheel of the utility vehicle. The axle tie rod preferably comprises here an area for a pivotable bearing, particularly preferably a bearing eye, and an area for securing the axle tube to the axle tie rod. The connecting element and the link element are preferably parts of the axle tie rod which permit particularly simple fabrication of the axle tie rod. In this context, the connecting element has a first connecting section in which a welded connection to the link element can be produced, or is preferably produced. The first connecting section of the connecting element is particularly preferably located in an area of the connecting element which extends in a plate shape and essentially in a planar fashion. In particular, the first connecting section preferably extends between the connecting region on the frame and the tube axis, or from this connecting region on the frame as far as the tube axis. A receptacle geometry, embodied as a bearing eye, of the axle tie rod for pivotably supporting the axle tie rod on a frame of the vehicle is preferably defined as a connecting region. Furthermore, the connecting element has a second connecting section in which a welded connection to an axle tube can be produced, wherein the second connecting section is preferably provided spaced apart from the first connecting section of the link element. In addition to the configuration of the second connecting section for the production of a welded connection to the axle tube, the second connecting section is configured in such a way that it engages around the axle tube. In this context, complete or approximately complete or predominant engagement around the axle tube is preferred. In other words, the second connecting section is preferably configured in such a way that it causes the axle tube to engage or extend around the tube axis. The tube axis is here preferably the axis of symmetry of the axle tube or particularly preferably the axis around which a wheel on the axle tube is rotatably mounted. In this context, the second connecting section of the connecting element is preferably embodied at least partially in the form of a circle or ring. It is particularly preferred that the second connecting section is adapted to the external geometry of the axle tube. Therefore, if the axle tube is, for example, in the form of a rectangle or in the form of a rounded rectangle, the second connecting section preferably also has a rectangular or rectangle-like internal configuration. If the axle tube is embodied in a cylindrical shape, the second connecting section is preferably embodied in an annular shape. The link element is preferably an essentially sheet-metal-like product which is, in particular, preferably embodied as a semi-finished product and already contains essential geometry features of the axle tie rod. Therefore, the link element preferably has a connecting region to be rotatably supported on the frame in which either the link element itself can be supported in a rotatable fashion by means of a bearing element on the frame of the utility vehicle or via an intermediately connected bushing element. The link element is particularly preferably embodied as a single-piece cast part or as a forged part. Forged parts have the advantage that owing to the reshaping processing they have a relatively high degree of strength, wherein in these parts the weight is relatively low. An advantage with the configuration of the axle tie rod with a connecting element and a link element is that in particular the load-bearing structures of the axle tie rod can preferably be distributed in an optimum fashion on the connecting element and the link element, wherein in particular a high degree of strength with simultaneous low weight can be achieved. Furthermore, the fabrication of the axle tie rod is significantly simplified, since in a first step a welded connection can be produced between the connecting element and the link element, and subsequently the axle tube can be arranged in the second connecting section of the connecting element and welded securely thereto. In this context, the axle tube is held, in particular, by the connecting element, as a result of which the handling of the axle tube and of the axle tie rod is significantly simplified.

The connecting element preferably has in the second connecting section a welding window which is embodied as a cutout and in which the welded connection between the connecting element and the axle tube can be produced. The welding window is preferably embodied as a cutout in the second connecting section in such a way that a welding seam can be produced along the inner edge of the welding window, between said inner edge of the welding window and the axle tube. In this context, the welded connection between the axle tube and the connecting element is particularly preferably produced exclusively in the welding window. In trials by the inventor of the present application it has been found that the strength of the welded connection between the axle tube and the link element or the connecting element, particularly high service life and strength values can be achieved if the welded connection between the axle tube and the connecting element is formed in a welding window. The welding window preferably has an essential oval opening in the second connecting section of the connecting element, wherein the rounding of the welding window has particular advantages with respect to the production of the welded connection, since welding does not have to be carried out in corners and therefore notch effect or similar negative effects can be avoided.

In one preferred embodiment, the connecting element has in a first state an excess dimension with respect to the external configuration of the axle tube. The first state is preferably the state of the connecting element in which the latter is not yet welded securely to the axle tube. In this first state, the second connecting section of the connecting element preferably has an excess dimension with respect to the external configuration of the axle tube, in other words the axle tube can be introduced with a certain amount of play into the second connecting section. The second connecting section of the connecting element is particularly preferably embodied so as to be deformable in an elastic or restorable fashion, with the result that it can be pressed against the axle tube by applying a force. The excess dimension of the second connecting section with respect to the external configuration or the outer face of the axle tube is preferably configured in such a way that the axle tube can be inserted manually into the second connecting section by a design engineer or user of the axle tie rod. It is not necessary here to widen the axle opening on the link element by heating or by means of relatively large forces to overcome friction between the link element and the axle tube.

The connecting element particularly preferably has in the first state a first cross-sectional face of the volume around which the second connecting section engages, which cross-sectional face is preferably 1.02-1.3 times, preferably 1.05-1.15 times and particularly preferably 1.1-1.15 times a second cross-sectional face of the external configuration of the axle tube in the region of the second connecting section. It is particularly preferred here that the maximum extent of the external configuration of the outer tube is smaller than the minimum extent of the second connecting section in the first state of the connecting element. In a further preferred case if, preferably, the axle tube has an essentially rectangular external configuration and the second connecting section also encloses an essentially rectangular volume, the cross-sectional face of the volume which is enclosed by the second connecting section is larger than the cross-sectional face of the axle tube in this region. In this context, the cross-sectional faces of the second connecting section and of the axle tube are particularly preferably each measured transversely, preferably perpendicularly, with respect to the tube axis of the axle tube. With respect to the connecting element which is preferably secured to the link element, the cross-sectional face of the volume which is enclosed by the second connecting section is preferably determined transversely with respect to the pivoting axis about which the link element is pivotably secured to the frame of a utility vehicle. It becomes apparent therefrom that the pivoting axis of the link element is preferably parallel to the tube axis of the axle tube which can be secured in the second connecting section of the connecting element. The first state is particularly preferably a "non-stressed" state of the connecting element, i.e. in which no tension or compressive stress which would elastically deform the connecting element is applied to it.

In particular, the connecting element preferably has a tensile region with which a tensile element is engaged or can be placed in engagement in order to constrict the second connecting section in such a way that the first cross-sectional face is reduced in size. In other words, a tensile element is provided in order to deform the second connecting section. The deformation of the second connecting section is preferably an elastic deformation here with the result that after the release of the force applied by the tensile element the second connecting section of the connecting element springs back into its neutral position, and the connecting element therefore springs back into its first state. As a result of the constriction of the first cross-sectional face in the second connecting section, the second connecting section is preferably pressed against the axle tube which can be arranged in the second connecting section. In this way, the axle tube can preferably be secured in a frictionally locking fashion to the connecting element.

The tensile element particularly preferably transmits a force to the connecting element in such a way that a tensile force which runs essentially parallel to the circumference of the axle tube acts in the second connecting section. The tensile element is preferably a screw or a bolt which engages in a thread either on the connecting element itself or on an additionally provided nut in order to apply a tensile force to the second connecting section of the connecting element. This force preferably acts parallel to the circumference of the axle tube or in other words parallel to a tangent on the circumference of the axle tube. Since deviations from the directions running parallel to the circumference can occur owing to the prestress and elastic deformation of the connecting element in the stressed state, a force direction which runs with an angular deviation of 5% from the parallel is also to be considered essentially parallel. In other words, the second connecting section therefore functions similarly to a pipe clamp known from the prior art in which the cross section which is provided in the pipe clamp is constricted by tensioning a screw, as a result of which the pipe clamp can be pressed against a pipe.

In a second state the connecting element is also preferably pre-stressed with respect to the axle tube. In the second state, in particular the second connecting section is pre-stressed against the axle tube by elastic deformation here. In this context, in the second state the connecting element in the second connecting section can be additionally also welded to the axle tube in order to pre-stress it against the axle tube. The second state of the connecting element is generated here, in particular, by the tensile element which transmits a force to the connecting element in the tensile region of the connecting element. The possibility of pre-stress of the second connecting section with respect to the axle tube makes it possible to produce a first connection between the connecting element and the axle tube in simple and releasable fashion, as a result of which the mounting of the axle tube on the axle tie rod is significantly simplified. Before the production of the welded connection between the second connecting section and the axle tube the user can firstly produce a frictionally locking connection between the two parts which, if corrections of the installation position are necessary, can be released once more and restored again.

In the second state, the connecting element is particularly preferably welded to the axle tube in the region of the welding window. It is particularly preferred that after the setting of the correct installation position of the axle tube relative to the connecting element a welded connection can be produced between the axle tube and the welding window of the second connecting section. In the second state, the connecting element is preferably already secured to the link element, with the result that an axle tube which is welded securely to the connecting element at the same time also means spatial and local securement of the axle tube with respect to the link element.

The welding window is preferably arranged on the connecting element in such a way that it is or can be secured on a compression half or a tensile half of the axle tube. The compression half of the axle tube is preferably the side which is loaded under compression in the region of the axle tie rod when the axle tube is bent during use of the utility vehicle. This is usually the upper side or the upper half of the axle tube in the region of the axle tie rod which, during use of the utility vehicle, faces away from the underlying surface on which the utility vehicle is driving. The tensile half is by analogy therewith the side of the axle tube which is loaded under tensile stress in the region of the axle tie rod during use of the utility vehicle. It is particularly preferred if the welding window is arranged on the connecting element in such a way that it can preferably be secured to the axle tube completely on the compression half or completely on the tensile half of the axle tube. As a result of this preferred configuration or arrangement of the welding window it is possible to avoid shearing stresses in the welding seam between the axle tube and the welding window, since either the entire welding seam is loaded under pressure or the entire welding seam is loaded under tension. In this way, the service life of the connection between the axle tie rod and the axle tube can advantageously be increased. With respect to the axle tie rod itself this arrangement of the welding window preferably means that the welding window is preferably arranged on the upper side of the axle tie rod. The upper side of the axle tie rod is preferably the side which points in the direction along which an air spring is supported on the axle tie rod in a supporting section of the axle tie rod or of the link element and transmits a force from the frame of the utility vehicle to the axle tie rod. By analogy therewith, the underside of the axle tie rod is defined as the side facing away from the upper side.

In the second state the connecting element is preferably welded to the link element in the region of the second connecting section. In addition to securing the second connection section to the axle tube in the region of the welding window it is advantageous if the connecting element is also welded to the link element in the second connecting section, in order to increase the strength of the axle tie rod and its connection to the axle tube. The welded connection between the link element and the second connecting section is advantageously embodied here as a spot weld joint or as a linear weld joint. The advantage of a spot weld joint is that it can be produced particularly quickly and with little thermal influence on the joining in the connecting element and in the link element. The advantage of a linear weld joint is that it makes available a continuous welding seam which has, however, relatively large thermal influence on the joining of the connecting element and the link element in the region of the welding seam. A spot-shaped or a linear-shaped welding seam is therefore correspondingly selected on the necessary strength values of the welded connection.

The link element preferably has an axle opening, wherein the axle opening has an excess dimension with respect to the external geometry of the axle tube, wherein the axle tube can be introduced with play into the axle opening. The axle opening in the link element is preferably oriented aligned with the volume enclosed by the second connecting section. Furthermore, the shape of the axle opening corresponds essentially to the external shape of the axle tube. The cross section of the axle opening is preferably the same as the cross section of the volume enclosed by the second connecting section in the first state of the connecting element. In the first state of the connecting element, the axle tube can therefore be introduced both through the axle opening and into the second connecting section without rubbing occurring. The assembling expenditure for producing the connection from the axle tie rod and the axle tube is therefore significantly simplified.

In one preferred embodiment, the link element comprises a first link part and a second link part, wherein the first and second link parts are or can be welded to the connecting element on opposite sides thereof. The link element is advantageously embodied in two parts, wherein a first link part and a second link part are preferably embodied as a semifinished product and can be combined to form the link element. The formation of the link element from a first link part and a second link part simplifies the fabrication, since the two link parts can be produced in a simple, for example, shaping method and can be combined to form the link element, and the link element is embodied at least partially as a component in the form of a hollow body. The first link part and the second link part advantageously each form one half of the link element, and the two link parts are preferably connected to one another both via the connecting element and the welded connections produced therewith as well as directly in certain areas.

In one preferred embodiment, the link element has a supporting section for securing a spring element. The supporting section of the link element preferably has here, in particular, engagement means such as, for example, drilled holes at which a spring element, preferably the air spring of a utility vehicle, can be secured. The supporting section preferably has a planar or plate-shaped region in which the air spring can be fitted on the link element. In this context, the supporting section serves to transmit force between the air spring and the link element, wherein the link element further transmits this force onto the axle tube in order to support it with respect to the frame of the utility vehicle. The first link part advantageously has a first half of the supporting section, and the second link part advantageously has a second half of the supporting section. In this way, a certain degree of redundancy for the securing of an air spring to the link element can be achieved, wherein when one of the link parts fails the other link part is always still available in order to support the air spring at least temporally and prevent total failure of the axle tie rod.

Furthermore, according to the invention a method for producing an axle tie rod is provided in which firstly a connecting element, a link element and an axle tube are made available, wherein the connecting element is arranged on the link element in such a way that a second connecting section of the connecting element is essentially aligned with an axle opening on the link element, wherein a first connecting section of the connecting element is secured to the link element, wherein the axle tube is introduced into the axle opening and the second connecting section, and wherein the second connecting section is secured to the axle tube. The method steps of the production method for an axle tie rod are particularly preferably carried out in the sequence described here. The method proposed here simplifies the production of an axle tie rod and also increases the precision of the components which are arranged with respect to one another and secured to one another. It is therefore initially possible for the connecting element to be arranged on the link element in the correct position and initially held in this position with a first welded connection. In this context, a second connecting section of the connecting element is advantageously oriented aligned with an axle opening on the link element in such a way that an axle tube can be introduced into the second connecting section and the axle opening. The formulation essentially aligned also includes here arrangements of the components with respect to one another which differ from the mathematically aligned arrangement owing to a relatively wide fit between the second connecting section and the axle opening with an angle of 2° to 6°. The preferred welded connection between the connecting element and the link element is preferably produced in a first connecting section of the connecting element. In the preferred case in which the link element has a first link part and a second link part, the first link part is initially welded to the connecting element and subsequently the second link part is welded. The axle tube is advantageously welded tight in the second connecting section after the axle tube has been introduced into the axle opening and the second connecting section and correctly positioned.

The axle tube is advantageously secured in a frictionally locking and materially joined fashion to the second connecting section. In this case, the frictionally locking connection is advantageously achieved by elastic deformation of the connecting element in the second connecting section. In this context, after the axle tube has been inserted or introduced into the second connecting section the frictionally locking connection is firstly preferably produced between the second connecting section and the axle tube, and subsequently a materially joined connection is added. The materially joined connection is preferably produced here in a welding window which is provided on the second connecting section. In this way, after the introduction of the axle tube the latter can firstly be secured in the correct position on the link element in a frictionally locking fashion, wherein subsequently a welded connection can be produced. This procedure is advantageous since an installer of the axle tie rod can even produce the frictional engagement with one hand, wherein with the other hand he can respectively hold the axle tube and move it into the correct position. The combination of securing the connecting element on the axle tube in a frictionally locking and materially joined fashion also preferably increases the strength of the connection between the axle tube and the connecting element, since not only the surfaces of the two components which adhere to one another or experience friction against one another secure them into one another but additionally a materially joined connection in the form of a welding seam can also be produced between the two parts. The strength of the axle tie rod in conjunction with the axle tube is preferably particularly high here.

Before the axle tube is secured to the second connecting section, the second connecting section is particularly preferably partially secured to the link element in a materially joined fashion. In addition to the welded connection between the link element and the connecting element in the first connecting section it may be preferred that a welded connection to the link element is also partially produced in the second connecting section. In this context, it is necessary merely to ensure that residual elastic deformability of the second connecting section remains in order to secure the axle tube to the second connecting section in a frictionally locking fashion. An advantage of the materially joined connection of the second connecting section to the link element is also increased strength of the axle tie rod.

The connecting element advantageously has a welding window in the second connecting section, wherein a materially joined connection is produced between the connecting element and the axle tube in the welding window. The materially joined connection is advantageously produced between the connecting element and the axle tube exclusively in the welding window. A plurality of welding windows, advantageously two welding windows, can also advantageously be provided on the connecting element. It has become apparent that the formation of a welding seam between the connecting element and the axle tube in the form of a welding window achieves higher strength values than all-round welding of the axle tube along its entire circumference. In this context, in particular, the strength of the axle tube is weakened less by the welded connection produced in the welding window than is the case in a conventional welded connection between an axle tie rod and an axle tube.

According to the invention, an axle tie rod can be produced or is preferably produced by means of a method comprising the steps:

making available a connecting element, a link element and an axle tube, arranging the connecting element on the link element in such a way that a second connecting section of the connecting element is essentially aligned with an axle opening on the link element, securing a first connecting section of the connecting element to the link element, introducing the axle tube into the axle opening and the second connecting section, and securing the second connecting section to the axle tube. As a result of the incremental joining of the axle tie rod proposed according to the method according to the invention and the combination of a frictionally locking connection with a materially joined connection between the connecting element, the link element and the axle tube, the axle tie rod achieves a particularly high level of strength with easy mounting. In this context, the joining of the respective connecting regions between the connecting element, link element and/or axle tube is, thanks to the proposed production method, adversely affected to a lesser degree, and the strength and service life of the axle tie rod can therefore be increased.

BRIEF DESCRIPTION OF THE DRAWINGS

Further advantages and features of the present invention can be found in the following description with reference to the appended figures. It is apparent here that individual features which are shown in only individual figures can also be used in other embodiments of other figures insofar as this has not been explicitly ruled out or is impossible owing to technical conditions. In the drawings.

DETAILED DESCRIPTION OF THE PREFERRED EMBODIMENTS

Figure 1:
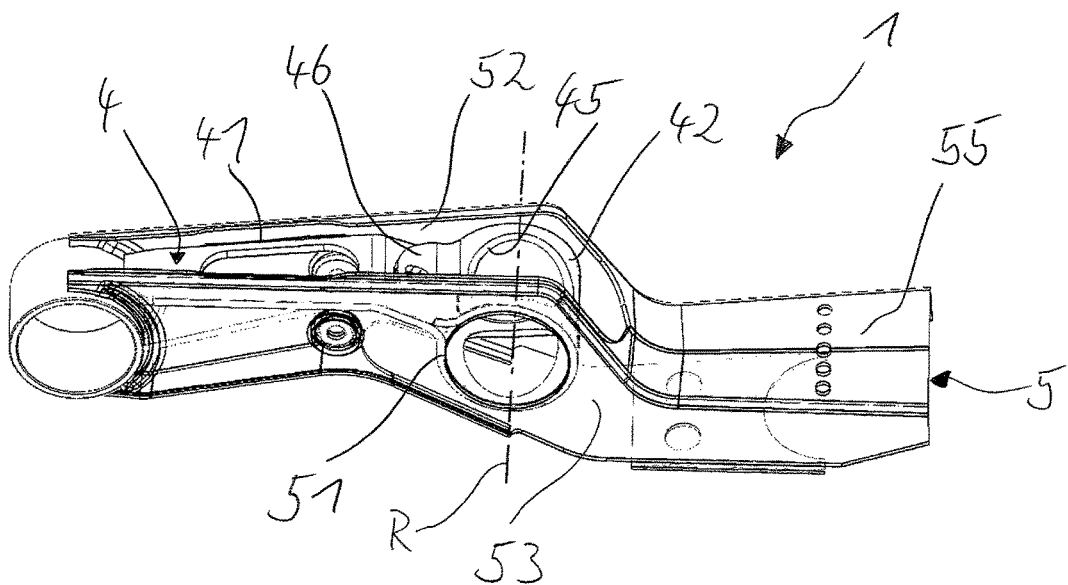
FIG. 1 shows a perspective view of a preferred embodiment of the axle tie rod according to the invention.

The axle tie rod 1 illustrated in FIG. 1 has a link element 5 which is composed of a first link part 52 and of a second link part 53. Furthermore, the axle tie rod 1 has a connecting element 4 which is preferably welded to the link element 5 in a first connecting section 41. In the embodiment shown in FIG. 1, the connecting element 4 preferably has two first connecting sections 41, wherein one of the first connecting sections 41 is welded to the first link part 52, and a second first connecting section 41 (not shown) is welded to the second link part 53. The connecting element 4 also has a second connecting section 42 which is preferably embodied curved in an annular shape, in order to enclose an axle tube 2 (not shown) and preferably secure it in an at least frictionally locking fashion. Furthermore, the second connecting section 42 has at least one welding window 45, wherein the embodiment illustrated in FIG. 1 has two welding windows 45. The connecting element 4 also has a tensile region 46 in which a tensile element 6 (not shown) can be arranged in order to transmit a tensile force to the tensile region 46. As a result of the force acting on the tensile region 46, the second connecting section 42 of the connecting element 4 is preferably elastically deformed in such a way that the spacing enclosed by the second connecting section 42 is constricted. In this way, the second connecting section 42 can be secured in a frictionally locking fashion to an axle tube 2. A welded connection to the axle tube 2 (not shown) is advantageously produced in the region of the welding window 45, particularly preferably in the region of the two welding windows 45. The link element 5 preferably has a supporting section 55. A spring element, preferably the air spring of a utility vehicle, can be secured to the link element 5 at the supporting section 55. Furthermore, in each case the first link part 52 and the second link part 53 preferably have one half of the supporting section 55. A welding seam is particularly preferably formed at the seam at which the link parts 52 and 53 are in contact with one another, in order to secure the link parts 52, 53 to one another. On the side shown on the left in the figure, the axle tie rod 1 preferably has a part in the form of a bushing with which the axle tie rod 1 can be rotatably secured to the bearing plug of a frame of a utility vehicle. In this context, the part in the form of a bushing is particularly preferably welded both to the first link part 52 and to the second link part 53. The connecting element 4 can particularly preferably also be welded tight to the bearing part in the form of a bushing.

Figure 2:
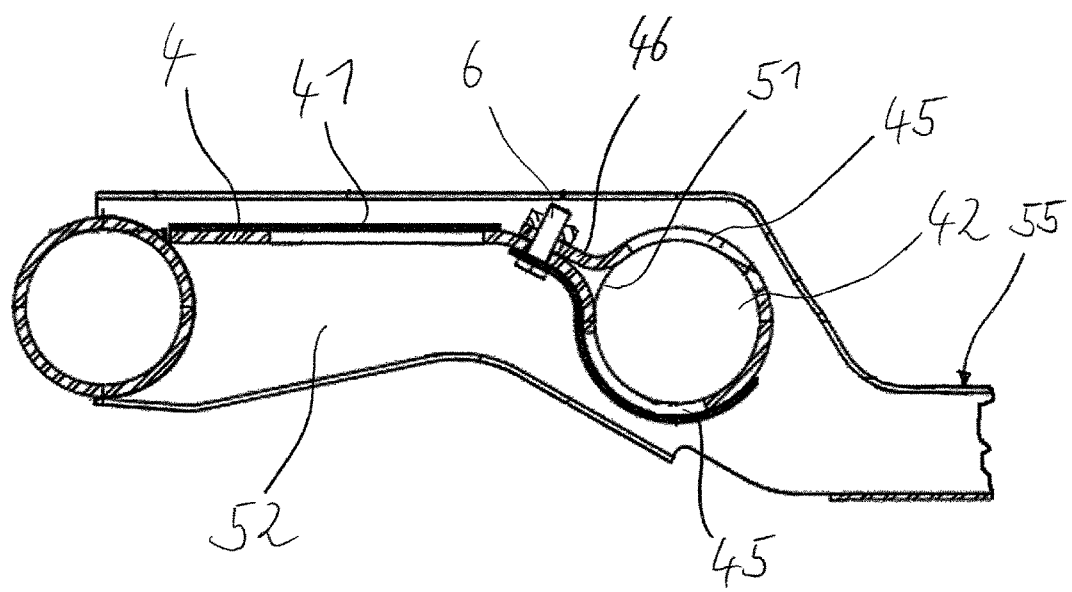
FIG. 2 shows a further perspective view of a preferred embodiment of the axle tie rod according to the invention with an axle tube arranged therein.

In the preferred embodiment of the axle tie rod 1 according to the invention shown in FIG. 2, only the first link part 52 of the link element 5 is illustrated, in order to avoid obstructing the view to the connecting element 4. In this context, in particular the second connecting section 42 and the axle opening 51 provided on the link element 5 or on the first link part 52 can be seen. The tensile element 6 is preferably embodied as a bolt, wherein a nut for tensioning of the bolt against the tensile region 46 of the connecting element 4 is provided. The regions of the first connecting section 41 and of the second connecting section 42 which are indicated in bold and in black are welding seams connecting to the link element 5 which are produced in the preferred sequence of the method according to the invention. Furthermore, the welding windows 45 in which a welded connection can be produced between the axle tube (not shown) and the second connecting section 42 are shown.

Figure 3:
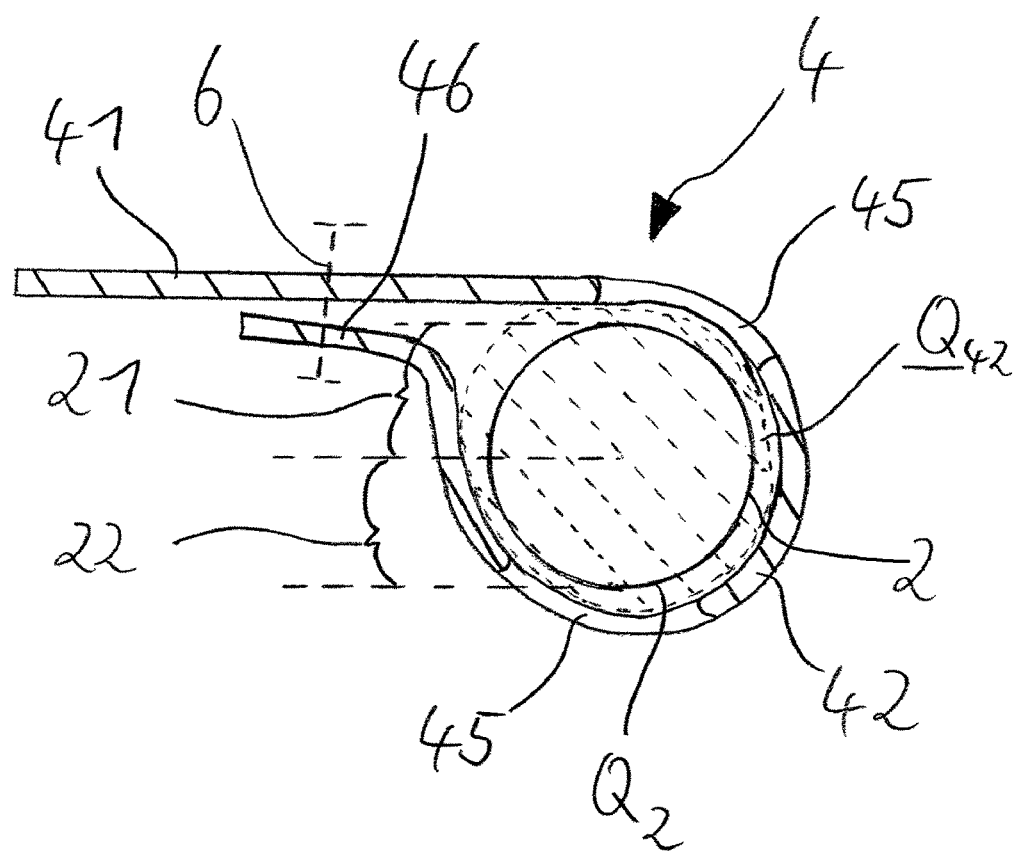
FIG. 3 shows a partially sectional side view of a preferred embodiment of the axle tie rod according to the invention.

The sectional view of the connecting element 4 and of the axle tube 2 shown in FIG. 3 illustrates, in particular, the cross-sectional face $Q_{42}$ of the volume enclosed by the second connecting section 42 in relationship to the relatively small cross-sectional face $Q_2$ of the axle tube 2. In this way, the axle tube 2 can be inserted with a certain amount of play into the second connecting section 42. In order to distribute the force transmitted by the axle tube 2 to the link element 4 in a particularly uniform fashion onto the link element 5 and with a favorable force flux, in the present example, the link element 4 surrounds the axle tube 2 in the clockwise direction in the second connecting section 42. In contrast to the embodiments illustrated in FIGS. 1 and 2, it is therefore ensured that the material of the connecting element 4 is continuous on the upper side of the connecting element 4, in order to apply the upwardly acting force, from the axle tube 2 onto the connecting element 4, in a particularly favorable fashion into the connecting element 4 and therefore also into the link element 5. Furthermore, it is illustrated that the axle tube 2 has a compression half 21 on its upper side and a tensile half 22 on its underside in the figure. It is particularly preferred that the one welding window 45 or the preferably multiplicity of welding windows 45 of the connecting element 4 are each arranged either in the compression half 21 or in the tensile half 22. In this way, thrust stresses in the region of the welding seam can be avoided. Preferably a tensile element 6 engages in the tensile region 46 of the connecting element 4 in order to force the second connecting section 42 against the axle tube 2. In the embodiment illustrated in FIG. 3, the connecting element 4 is preferably illustrated in its first state, wherein by pulling together the tensile element 6 it is possible to constrict the second connecting section 42, and the axle tie rod 1, in particular the connecting element 4 can therefore preferably be placed in the second state.

LIST OF REFERENCE SYMBOLS

2 Axle tube
4 Connecting element
5 Link element
6 Tensile element
21 Compression half
22 Tensile half
41 First connecting section
42 Second connecting section
45 Welding window
46 Tensile region
51 Axle opening
52 First link part
53 Second link part
55 Supporting section
$Q_{42}$ Cross-sectional face of second connecting section
$Q_2$ Cross-sectional face of axle tube
R Tube axis

The invention claimed is:

1. An axle tie rod configured to be secured to an axle tube of a utility vehicle comprising:
   a connecting element; and
   at least one link element;
   wherein the connecting element has a first connecting section configured to be welded with the link element;
   wherein the connecting element has a second connecting section configured to be welded with the axle tube;
   wherein the second connecting section is configured to engage around the axle tube; and
   wherein the first connecting section is located in a region of the connecting element which extends in a plate shape and extends between a connecting region on a frame of the utility vehicle and the axle tube, and wherein the connection region includes a bearing eye configured to pivotably support the axle tie rod on the frame of the vehicle.

2. The axle tie rod as claimed in claim 1, wherein the connecting element has in the second connecting section a welding window which includes a cutout in which the welded connection between the connecting element and the axle tube can be produced.

3. The axle tie rod as claimed in claim 1, wherein the connecting element has in a first state an excess dimension with respect to an external configuration of the axle tube.

4. The axle tie rod as claimed in claim 1, wherein in the first state of the connecting element a first cross-sectional face of a volume around which the second connecting section engages is 1.02 to 1.3 times a second cross-sectional area of the external configuration of the axle tube in the region of the second connecting section.

5. The axle tie rod as claimed in claim 4, wherein in the first state of the connecting element the first cross-sectional face of the volume around which the second connecting section engages is 1.05 to 1.15 times a second cross-sectional area of the external configuration of the axle tube in the region of the second connecting section.

6. The axle tie rod as claimed in claim 5, wherein in the first state of the connecting element the first cross-sectional face of the volume around which the second connecting section engages is 1.1 to 1.15 times a second cross-sectional area of the external configuration of the axle tube in the region of the second connecting section.

7. The axle tie rod as claimed in claim 1, wherein the connecting element has a tensile region with which a tensile element can be placed in engagement in order to constrict the second connecting section to reduce the size of the first cross-sectional face.

8. The axle tie rod as claimed in claim 1, wherein the tensile element transmits a force to the connecting element such that a tensile force which runs essentially parallel to the circumference of the axle tube acts in the second connecting section.

9. The axle tie rod as claimed in claim 1, wherein in a second state the connecting element is prestressed with respect to the axle tube.

10. The axle tie rod as claimed in claim 9, wherein in the second state the connecting element is welded to the axle tube in the region of the second welding window.

11. The axle tie rod as claimed in claim 2, wherein the welding window is arranged on the connecting element such that the connecting element can be secured on a compression half or a tensile half of the axle tube.

12. The axle tie rod as claimed in claim 9, wherein in the second state the connecting element is welded to the link element in the region of the second connecting section.

13. The axle tie rod as claimed in claim 1, wherein the link element has an axle opening having an excess dimension with respect to the external geometry of the axle tube where the axle tube can be introduced with play into the axle opening.

14. The axle tie rod as claimed in claim 1, wherein the link element comprises a first link part and a second link part, and wherein the first and second link parts are configured to be welded to the connecting element on opposite sides thereof.

15. A method for producing an axle tie rod, comprising:
providing a connecting element;
providing a link element;
providing an axle tube;
arranging the connecting element on the link element such that a second connecting section of the connecting element is substantially aligned with an axle opening on the link element;
securing a first connecting section of the connecting element to the link element;
introducing the axle tube into the axle opening and the second connecting section; and
securing the second connecting section to the axle tube.

16. The method as claimed in claim 15, wherein before the axle tube is secured to the second connecting section, the second connecting section is secured partially to the link element in a materially joined fashion.

* * * * *